United States Patent
Jacobson et al.

(10) Patent No.: US 9,058,127 B2
(45) Date of Patent: Jun. 16, 2015

(54) DATA TRANSFER IN CLUSTER STORAGE SYSTEMS

(75) Inventors: Michael B. Jacobson, Boise, ID (US);
Brian Patterson, Boise, ID (US);
Ronald D. Rodriguez, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2262 days.

(21) Appl. No.: 11/796,690

(22) Filed: Apr. 27, 2007

(65) Prior Publication Data

US 2008/0270727 A1    Oct. 30, 2008

(51) Int. Cl.
*G06F 12/02* (2006.01)
*G06F 3/06* (2006.01)
*G06F 11/20* (2006.01)

(52) U.S. Cl.
CPC .......... *G06F 3/0689* (2013.01); *G06F 11/2071* (2013.01); *G06F 11/2082* (2013.01)

(58) Field of Classification Search
CPC ..................................................... G06F 3/0689
See application file for complete search history.

(56) References Cited

U.S. PATENT DOCUMENTS

| | | | |
|---|---|---|---|
| 6,675,268 B1* | 1/2004 | DeKoning et al. | 711/151 |
| 2005/0108487 A1* | 5/2005 | Kobayashi et al. | 711/162 |
| 2006/0184732 A1* | 8/2006 | Ito | 711/114 |
| 2006/0242380 A1* | 10/2006 | Korgaonkar et al. | 711/170 |
| 2008/0005507 A1* | 1/2008 | Madnani et al. | 711/161 |

* cited by examiner

*Primary Examiner* — Charles Rones
*Assistant Examiner* — Ryan Dare
(74) *Attorney, Agent, or Firm* — Law Office of Philip Scott Lyren (57) ABSTRACT

Embodiments include methods, apparatus, and systems for data transfer in storage systems. One embodiment includes a method that transmits a state of cached write data and mapping metadata associated with a disk group from a first array to a second array and then transfers access to the disk group from the first array to the second array while host applications continue to access data in the disk group.

19 Claims, 4 Drawing Sheets

DATA TRANSFER IN CLUSTER STORAGE SYSTEMS

BACKGROUND

Enterprises commonly maintain multiple copies of important data and expend large amounts of time and money to protect this data against losses due to disasters or catastrophes. In some storage systems, data is stored across numerous disks that are grouped together. These groups can be linked with arrays to form clusters having a large number of individual disks.

In cluster storage systems, data availability can be disrupted while arrays or groups of disks are being managed. For instance, it may be desirable to transfer access to disk groups from one array to another array. During this transfer, however, applications accessing data within the disk group can fail or timeout and cause a disruption to application service and operation of the enterprise. Such disruptions can also occur when arrays are added or removed from a cluster.

Regardless of the backup or data transfer techniques being used, enterprises can lose valuable time and money when storage arrays are taken offline or shutdown. In these situations, applications are shutdown, storage devices are disconnected and reconnected, LUNs (logical unit numbers) are re-mapped, etc. While the storage arrays are offline, operation of the enterprise is disrupted and jeopardized.

DETAILED DESCRIPTION

Embodiments are directed to apparatus, systems, and methods to maximize data availability during a transfer of disks or disk groups between arrays in a clustered array storage system. Access to disk groups is transferred between arrays in a cluster without loss of user access to applications using the disk groups. During a disk group transfer operation, embodiments implement data transfer while maintaining transparency of the disk group transfer operation to a set of host applications using the disk group.

One embodiment includes a clustered array storage architecture in which multiple individual array storage systems are configured from a pool of shared resources that are accessible on a common network. The shared resources include disks, disk shelves, and network infrastructure components. Each individual array comprises one or more array controllers and a subset of the shared resources.

Exemplary embodiments provide the ability to move access to the shared resources between arrays without disrupting data availability to and from host applications. Embodiments further provide performance and capacity scaling, load balancing, data movement and other useful features that cannot be obtained directly from a group of independent arrays.

In one embodiment, a class of objects or storage resources called the disk group is the unit of data storage whose access is moved between arrays in the cluster. A disk group comprises two or more physical data storage disks and the definition of a set of logical disks that are the host visible storage containers. The logical disks are virtual objects that use the physical disks as a backing store for the host data. One embodiment maximizes availability of data in the logical disks of a disk group during the transfer of access to a disk group between arrays in the cluster.

In one embodiment, transfer of access to a disk group between arrays in a cluster involves transferring the current state of the cached user data and metadata associated with the disk group between the arrays. The user data in the disk group that is not cached is implicitly transferred in the process because it is resident on the disks whose access is being transferred.

The state being transferred is stored in different forms in a number of different storage repositories of the array including reserved space on one or more disks, the disks of the disk group, the volatile and non-volatile memory that comprises the array user data cache and the volatile memory that comprises the data store of the array control processors. A synchronized state is maintained between two separate arrays while control to data in a disk group is transferred in real-time between the two arrays. Mapping metadata, configuration metadata, and cached user data are copied in a first array and then transferred to the second array without disrupting data availability to and from the disk group. During the transfer, the first and second arrays continue to process input/output (I/O) requests, and applications running in the hosts can continue to access the disk group without timing out (example, failing because a request was not timely processed). Data access is available during the time of the transfer operation and includes instances in which changes to the state occur. If data access is not available during the whole time of the process, then this time of unavailability is relatively short compared to the time for a host to incur an I/O timeout. The unavailable time is less than host application timeout times.

In one embodiment, the actual user data stored in the disk group is not copied. Instead, access or control to this user data is transferred from one array to another array. During this transfer, data is copied from one array to another array, but this data includes one or more of the mapping metadata, configuration metadata, and cached user data associated with the disk group but not the disk resident user data in the disk group. The mapping metadata describes where on a disk the disk resident user data is stored. For instance, this metadata provides the mapping from the host address to the disk address. For example, in a SAN (storage area network) using SCSI (small computer system interface) protocol, LUNs (logical unit numbers) provide an address for an individual disk drive. The LUNs are addressed in conjunction with a controller ID (identification) of the HBA (host bust adaptor) and target ID of the storage array. The configuration metadata describes which disks belong to which disk group. This metadata also defines how the disks are organized and defines the logical disks (example, size, RAID level, which disks can use storage, etc.). The cached user data includes reads and writes. Cached reads are data retrieved from a disk and waiting in temporary cache memory to be transferred from the array. Cached writes are data received from applications or hosts and waiting in temporary cache memory to be transferred to disk storage.

In one embodiment, the state data is associated with the storage resource (example, a disk group) whose access is being transferred between storage devices (example arrays). Mirroring the state data facilitates the transfer of access to the storage resource. Exemplary embodiments are not limited to a particular type of storage resource, such as a disk group. For example, within a disk group there are host visible storage units called logical disks. In one embodiment, the transfer of access is applied to a logical disk rather than a whole disk group.

Figure 1:
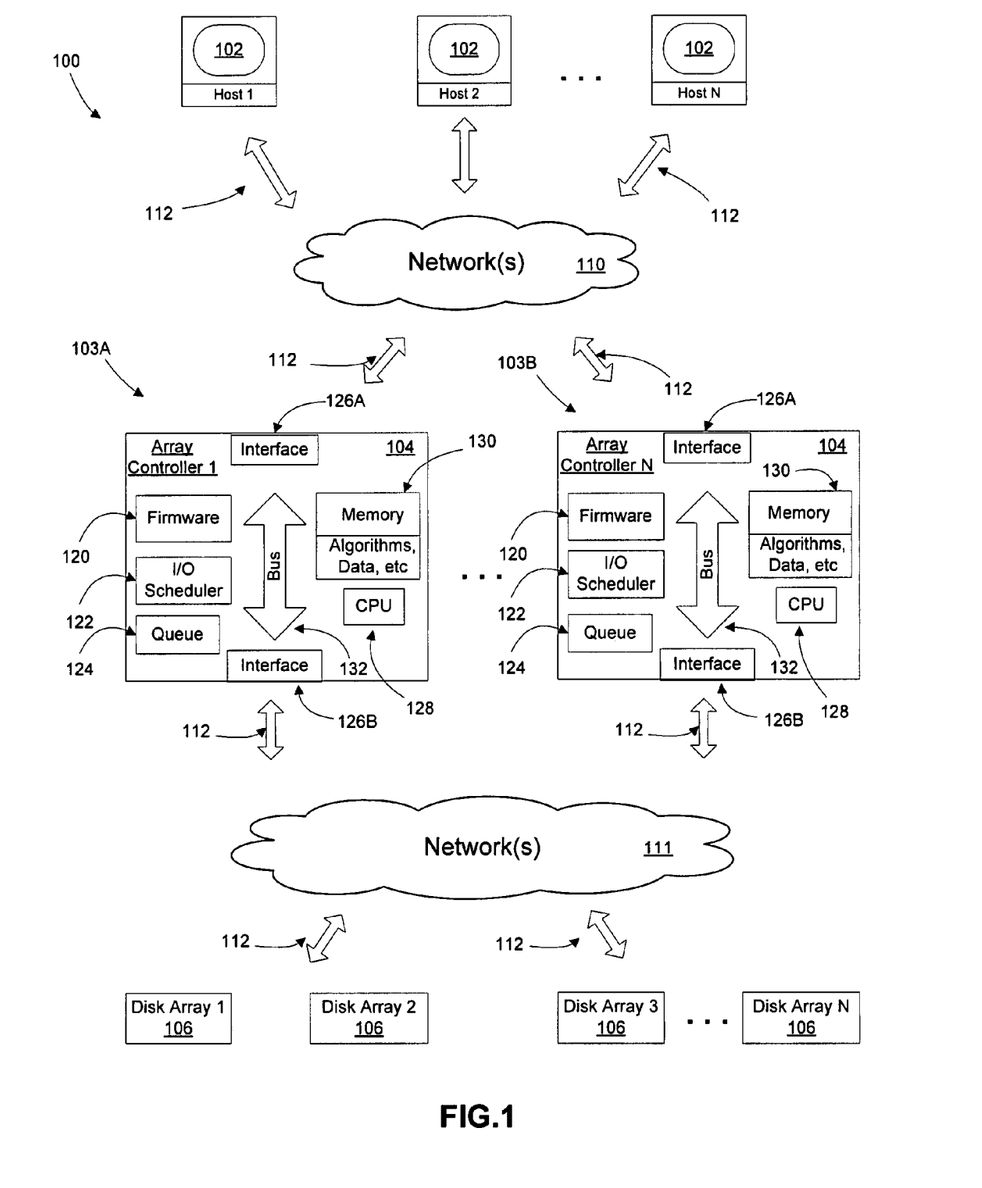
FIG. 1 is a block diagram of a cluster storage system in accordance with an exemplary embodiment of the present invention.

FIG. 1 is a block diagram of an exemplary distributed file or storage system 100 in accordance with an exemplary embodiment of the invention. By way of example, the system is a cluster storage network and/or a storage area network (SAN) that includes a plurality of host computers 102 and one or more storage devices or arrays 103A, 103B that include one or more storage controllers 104 (shown by way of example as an array controller), and a plurality of storage devices 106 (shown by way of example as disk array 1 to disk array N).

The host computers 102 (shown as host 1 to host N) are coupled to the array controllers 104 through one or more fabrics or networks 110, and the storage devices or arrays 103 are coupled to the storage devices 106 through one or more fabrics or networks 111. For instance, the hosts communicate with an array controller using a small computer system interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102. For instance, processor 128 is coupled to a host interface 126A that provides bidirectional data communications to one or more host computers 102. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc . . . bytes each) or stripe fragments (4K, 16K, 32K, etc . . . each).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

In one embodiment the storage devices 103A, 103B are disk arrays. Each disk array can have one or more controllers. For instance, an array has two controllers for redundancy.

In one embodiment, storage devices 103A, 103B are physically located in a same data center. In another embodiment, the storage devices are located a great geographical distance apart in separate data centers. Further, although only two storage devices are shown, a SAN can include hundreds or thousands of such storage devices.

Figure 2:
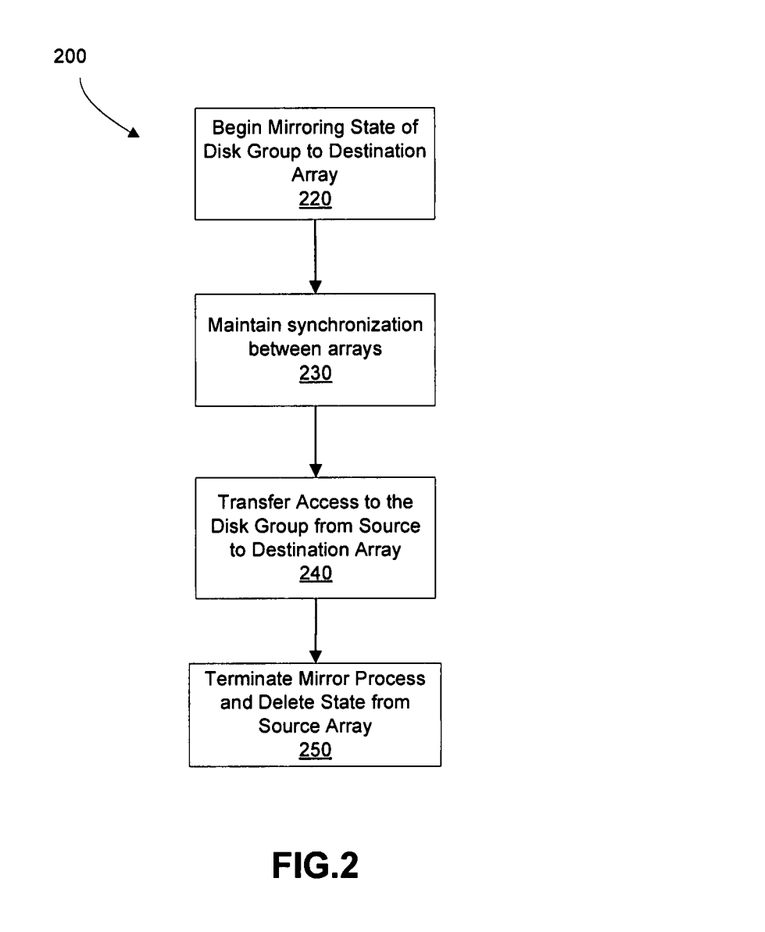
FIG. 2 is a flow diagram for transferring access to a disk group between storage devices in accordance with an exemplary embodiment of the present invention.

FIG. 2 is a flow diagram 200 for transferring access to a disk group between storage devices in accordance with an exemplary embodiment of the present invention. For purposes of discussion and illustration, a source storage device will transfer a state of a group of disks to a destination storage device. For purposes of discussion and illustration, a source array transfers the state of a disk group to a destination array.

At the start of the disk group transfer process, the state of the disk group (the cached user data, mapping metadata, and configuration metadata associated with the disk group) exists only on the source array.

According to block 220, the state of the disk group in the source array begins to be mirrored or copied to the destination array. While access to the disk group continues on the source array, the state of the disk group begins to be mirrored to the destination array. Applications continue to send I/O requests to the source and destination arrays without disrupting or jeopardizing data availability. However, all I/O requests for the disk group being transferred are sent to the source array until the transfer is complete. Then the I/O requests are sent to the destination array. I/O requests for other disk groups not being transferred continue to be received and processed by the respective arrays on which they are being managed.

According to block 230, synchronization is maintained between the source and destination arrays while the state of the disk group is mirrored from the source array to the destination array.

In one exemplary embodiment, the state mirroring process includes two aspects. The first aspect is a background process to mirror the entire state from source array to destination array. The second aspect is on-demand or real-time reflection from source to destination of ongoing changes in the state as those changes occur on the source. Host I/O continues to be processed on the source while the background process of mirroring the state proceeds. If a change occurs on the source to some part of the state that has already been mirrored to the destination, the change is reflected from source to destination to keep the destination in synchronization with the source. Once the background process of mirroring the entire state has been completed, the on demand process of reflecting changes ensures the copy of the state on the destination is fully in synchronization with the state on the source and the destination is ready for the transfer.

According to block 240, access to the disk group is transferred from the source array to the destination array once synchronization occurs. In other words, when the mirrored copy of the disk group state on the destination array reaches synchronization with the state on the source array, an instantaneous transfer of access to the disk group from the source array to the destination array occurs.

According to block 250, after the transfer occurs, the state mirroring process is terminated and the state of the disk group is deleted from the source array.

During the time that the disk group state is being mirrored from the source array to the destination array and before the transfer occurs, any changes to the state that occur on the source array are reflected to the destination array as part of the mirroring process. After the transfer, no further changes to the state of the disk group will occur on the source array because I/O requests for the disk group are no longer being received by the source array so there will be no further reflection of state changes from the source to the destination. I/O requests for the disk group are now received at the destination array.

Figure 3:
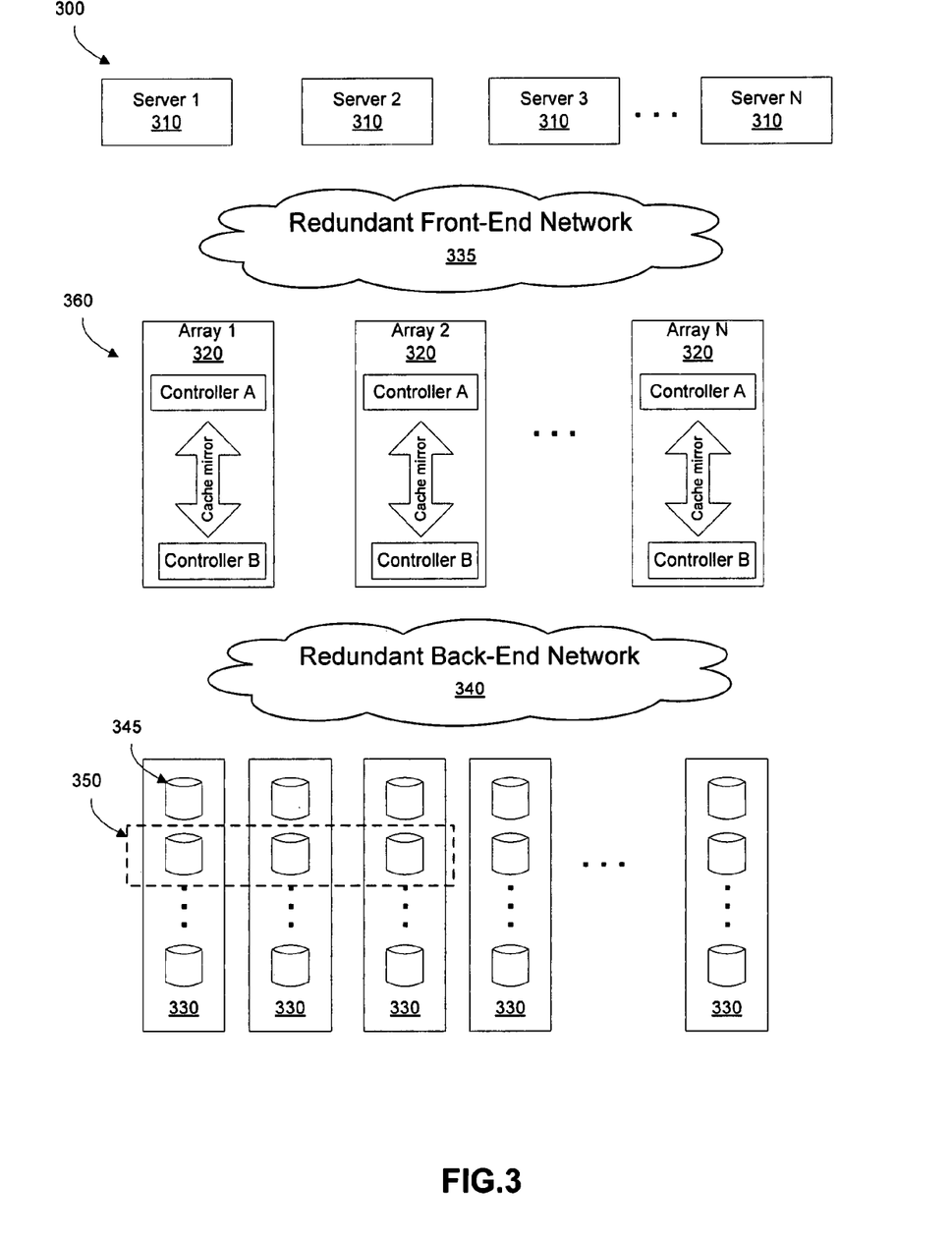
FIG. 3 is a block diagram of a cluster storage system in accordance with an exemplary embodiment of the present invention.

FIG. 3 is a block diagram of a cluster storage system 300 in accordance with an exemplary embodiment of the present invention. The system includes a plurality of servers 310, arrays 320, and storage devices 330. The servers 310 communicate with the arrays 320 through a redundant front-end network 335. The arrays 320 communicate with each other and/or the storage devices through a redundant back-end network 340.

In one embodiment, the arrays 320, storage devices 330, and network 340 form a cluster 360. This cluster appears as a single large array to the servers. Since I/O can be forwarded through the backend-end network 340. In one embodiment, a disk group can only be accessed through its assigned array, not through every array. Only the assigned array holds the current state of the disk group. I/O access requires access to the state of the disk group.

In one embodiment, each storage device includes a plurality of disks 345. The disks are grouped together into disk groups, such as disk group 350. The storage devices or disk groups can be configured as a JBOD (Just a Bunch of Disks). Usually, in a JBOD, the disks are each accessed as independent storage devices rather than a concatenation or other type of collection. In one embodiment, the disks are accessed independently by the arrays and are presented by the arrays to the hosts as logical RAID storage devices.

For illustration, each array 320 has two redundant controllers (shown as controller A and controller B). Cache mirroring exists between each of the two redundant controllers. Each array can manage one or more disk groups with each group having one or more disks. A single disk group is managed by a single controller pair in an array. For instance, disk group 350 is managed by the two controllers in array 1.

Figure 4:
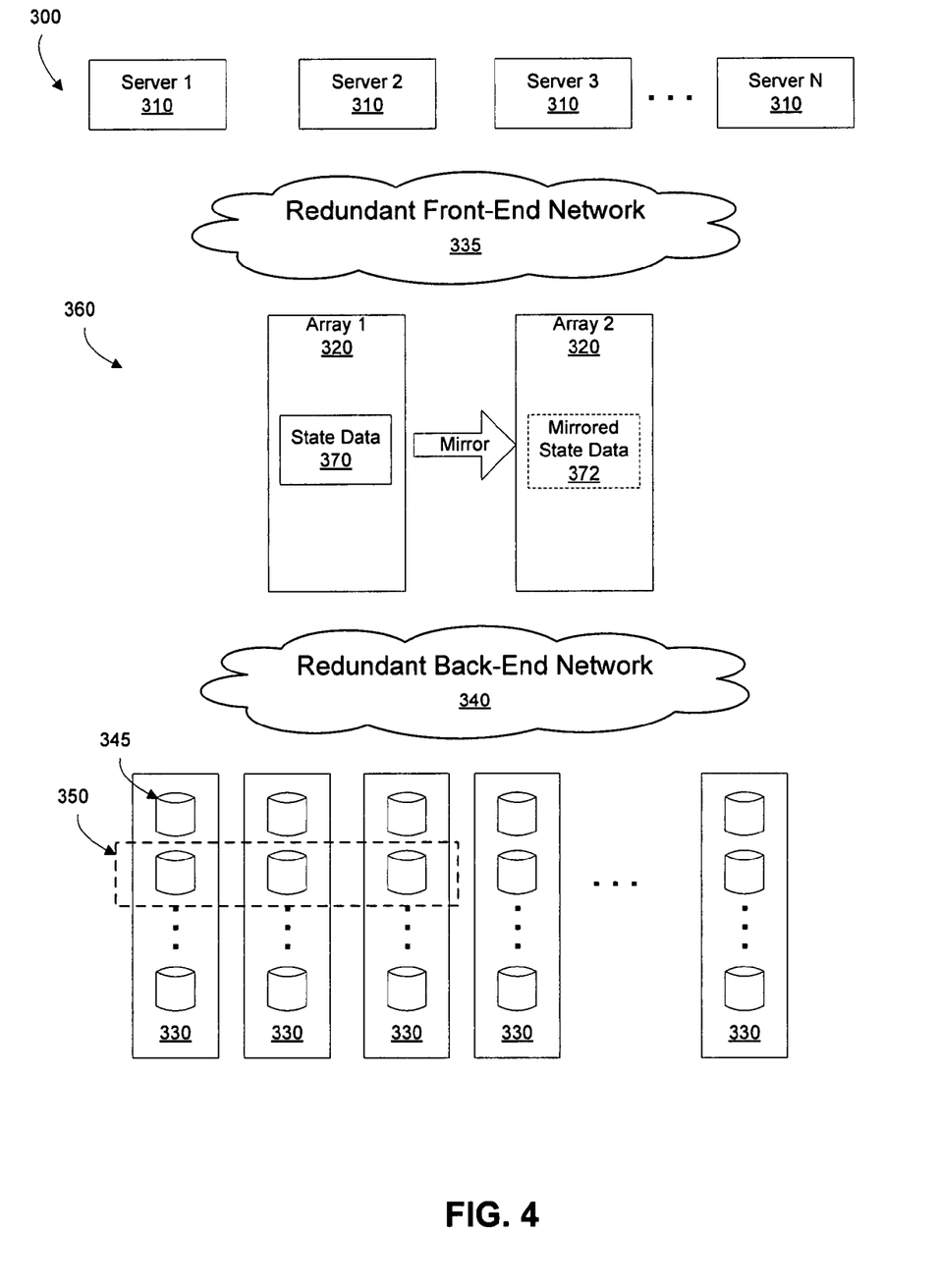
FIG. 4 is a block diagram showing a disk group transfer in a cluster storage system in accordance with an exemplary embodiment of the present invention.

Embodiments provide fast transfer of state data between arrays and can be applied to various methods, such as adding or removing arrays from the cluster, upgrading arrays in the cluster, isolating or repairing an array in the cluster, etc. By way of example, FIG. 4 is a block diagram showing a disk group transfer in the cluster storage system 300 in accordance with an exemplary embodiment of the present invention.

Disk group transfer moves access to a disk group from one array to another by mirroring the state of the disk group from the source to the destination. Embodiments mirror the state to resources on the destination that will be used for ongoing management of the disk group on the destination after the transfer is complete. The state can be mirrored directly from the source array to the destination array without first being cloned or copied on the source array.

For illustration, array 1 manages disk group 350 in cluster 360. Exemplary embodiments enable management of data in disk group 350 to be altered so the data in this disk group is available to more servers. For instance, it may be desirable to have a larger or more varied access to the disk group 350.

Initially, the state data 370 associated with the disk group 350 begins to be mirrored directly from array 1 (the source array) to array 2 (the destination array). The state data 372 in array 2 is shown with a dashed box to indicate that the data is being mirrored to array 2 from array 1. Synchronization of data occurs during the mirroring of data. Once the transfer of state data is complete, access to the disk group 350 is transferred from the source array to the destination array. During the transfer period, server access to data in the disk group is not disrupted or discontinued since I/Os continue to be processed.

In one embodiment, the time to transfer the state data is shorter than timeout times for applications executing in the servers. For example, if a server host experiences a timeout after 15 to 60 seconds, then the transfer time would be less than 15 seconds. As such, the server would not experience a timeout while the transfer occurred from the source array to destination array.

Once the transfer is complete, the destination array informs the server to now send I/Os to the destination array instead of the source array. Further, once I/Os are no longer being accepted at the source array, such I/Os can be queued until the transfer completes and they are ready for processing on the destination array. Alternatively, I/Os occurring during the transfer can be failed. Error code sent to the requesting server can indicate to retry the I/O to the destination server (i.e., instruct the host to retry the I/O but not switch destinations).

The logical disk mapping metadata for logical disks in a disk group is stored on the disks of the disk group. The configuration metadata for a disk group is stored in reserved space of the source array (such as in one or more of the disks in a disk group). An in memory copy of the mapping metadata and configuration metadata is stored in the volatile data store memory of the array control processors in a different form. Cached user data for logical disks in the disk group is stored in volatile and non-volatile cache memory areas. This stored information taken in combination comprises the state of the disk group that is mirrored from the source to the destination array during the disk group transfer process.

The disks of the disk group being transferred are used as a communications medium for the on disk mapping and configuration metadata. In one exemplary embodiment, during normal array operation, the on disk mapping metadata exists only on the disks of the disk group so it need not be mirrored. Changes can occur to the mapping metadata during the disk group transfer process as a result of data access on the source array. Those changes are made by the source array prior to the transfer so the copy of the mapping metadata that exists on the disks of the disk group at the time of transfer is fully synchronized. Thus, no reflection of changes from source array to destination array during the transfer process is required.

The transfer of the disk group from source to destination arrays can require object identities be changed for certain objects referred to by the mapping metadata as these identities can be different on the source and destination arrays. To facilitate this change, a second copy of the mapping metadata is made on the disks of the disk group. The second copy is created to refer to the identities of the objects as they will exist on the destination array. As changes are made to the mapping metadata during the disk group transfer process, both copies of the on disk mapping metadata, the copy with source array object identities, and the copy with destination array object identities are modified. When the transfer occurs, the destination array begins using the copy of mapping metadata that contains object identities valid on the destination array and deletes the copy of mapping metadata that contains the source array object identities.

The on disk configuration metadata is mirrored from source to destination array through a copy process using the disks of the disk group. It is copied from the reserved space of the source array to the disks of the disk group, then from the disks of the disk group to the reserved space of the destination array. Changes to the configuration of the disk group (examples: adding or removing physical disks, creating or destroying logical disks) are prohibited during the transfer process so the on disk configuration metadata for the disk group remains stable and no changes need to be reflected from source to destination array after the configuration metadata has been mirrored to the destination array. This process does not impact availability of data in the logical disks of the disk group because data access does not require or result in configuration changes.

The in memory configuration metadata is also mirrored from source to destination through a similar or same copy process. When the on disk configuration metadata is copied from the disks of the disk group to the reserved space of the destination array, it is also used to create the in memory copy of the configuration metadata on the destination array. Since configuration changes to the disk group being transferred are prohibited, there is no need to reflect changes to the in memory copy of the configuration metadata from source to destination array. Existence of the disk group configuration metadata in the reserved space of the destination array and in the memory of the destination array control processors is the condition that would indicate the disk group is to now being actively managed by the destination array. However, the transfer of access to the disk group may not have occurred yet because the rest of the disk group state has not yet become fully synchronized between the source and destination arrays. An online state attribute in the disk group configuration metadata on the destination array is used to indicate completion of the transfer and to trigger active management of the disk group by the destination array.

The in memory logical disk mapping metadata is mirrored from source to destination arrays through an inter-array network communications protocol and process. The change in object identities from source to destination arrays for objects referred to by the mapping metadata occurs as part of this communications process. The communications process supports both the initial mirroring of the in memory mapping metadata and the reflection of changes that occur on the source array after the mirroring process begins and before the transfer is complete.

The cached user write data for logical disks in the disk group being transferred is mirrored from source to destination arrays also through an inter-array network communications protocol and process. This protocol and process may be different than the communications protocol and process used to mirror the in memory logical disk mapping metadata. The cached user read data for logical disks in the disk group need not be mirrored because a copy of this data also exists on the disks of the disk group. The cached read data can be read from the disks and placed in the read cache again on the destination array after the transfer occurs.

The communications process for the cached write data supports both the initial mirroring of the data and the reflection of changes that occur on the source array after the mirroring process begins and before the transfer is complete. The communications protocol and process may be similar to that used to mirror cached write data between the two controllers of a single array or may be similar to that used to communicate data between arrays in an inter-array replication configuration.

An alternative for mirroring the on disk and in memory copies of the configuration metadata from source to destination arrays is to use an inter-array network communications protocol and process rather than using the disks of the disk group as a communications medium. Using this approach, the mirroring process and thus the transfer process can complete more quickly because the in memory and on disk copies of the configuration metadata can be written in parallel on the destination array. The intermediate copy of this information need not be written to the disks of the disk group.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization. As used herein, a "target port" is an interface on an electronic device that receives I/O requests and/or data. As used herein, an "initiator port" is an interface on an electronic device that transmits I/O requests and/or data.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   storing user data of a disk group in a storage resource that is controlled by a first storage array;
   mirroring state data of the user data of the disk group in the storage resource from the first storage array to a second storage array; and
   transferring access to the user data of the disk group in the storage resource from the first storage array to the second storage array without copying the user data of the disk group stored in the storage resource and without disrupting applications on hosts that are using the first storage array, the second storage array, or the storage resource.

2. The method of claim 1 further comprising, transferring access to the storage resource when a state of a mirrored copy of the data on the second storage array synchronizes with a state of the state data on the first storage array.

3. The method of claim 1 further comprising, reflecting changes to a state occurring on the first storage array to a state on the second storage array during a time that the state data is being mirrored from the first storage array to the second storage array.

4. The method of claim 1, wherein the state data includes metadata for mapping host addresses to addresses on disk, metadata for configuring disks in a disk group, and cached write requests from hosts.

5. The method of claim 1 further comprising, deleting the state data from the first storage array when access to a disk group is transferred from the first storage array to the second storage array.

6. The method of claim 1 further comprising, transferring control of a disk group associated with the state data from the first storage array to the second storage array without disrupting processing of input/output (I/O) requests from the applications in the hosts.

7. The method of claim 1 further comprising, enabling the applications in the hosts to have continuous access to a data in a disk group associated with the state data while control of the disk group is transferred from the first storage array to the second storage array.

8. A non-transitory computer readable medium having instructions for causing a computer to execute a method, comprising:
   storing user data in a disk group that is controlled by a first array;
   transferring a current state of cached user data and metadata associated with the disk group from the first array to a second array while control of the disk group continues on the first array; and
   transferring, without copying the user data in the disk group, control of the user data in the disk group from the first array to the second array when a copy of the current state on the second array synchronizes with the current state on the first array.

9. The non-transitory computer readable medium of claim 8 further comprising, transferring control of the disk group from the first array to the second array while continuing to process input/output (I/O) requests from hosts accessing the disk group.

10. The non-transitory computer readable medium of claim 8 further comprising, accepting changes to mapping metadata associated with the disk group while transferring control of the disk group from the first array to the second array.

11. The non-transitory computer readable medium of claim 8 further comprising, providing access to data stored in the disk group during an entire time while control of the disk group is being transferred from the first array to the second array.

12. The non-transitory computer readable medium of claim 8 further comprising, completing transfer of control of the disk group between the first and second arrays in a time that is less than a timeout period for applications accessing the disk group.

13. The non-transitory computer readable medium of claim 8 further comprising, mirroring the current state of the cached user data and metadata on the first array before transferring control of the disk group from the first array to the second array.

14. The non-transitory computer readable medium of claim 8, wherein the current state of the cached user data and metadata only exist on the first array before a process commences to transfer control of the disk group from the first to second arrays.

15. A method, comprising:
   storing user data in a disk group that is accessed and controlled by a first array;
   transmitting a state of cached write data and mapping metadata associated with the user data of the disk group from the first array to a second array;

transferring control of the disk group from the first array to the second array without copying the user data in the disk group and while host applications continue to access data in the disk group.

16. The method of claim 15, wherein the first and second arrays each have two redundant controllers.

17. The method of claim 15, wherein a transfer of the disk group from the first array to the second array changes object identities for objects referred to by the mapping metadata when object identities are different on the first and second arrays.

18. The method of claim 15 further comprising, transferring control when a copy of the state of cached write data and mapping metadata on the second array synchronizes with a state of cached write data and mapping metadata on the first array.

19. The method of claim 15 further comprising, generating a copy of the state of cached write data and mapping metadata in the first array.

* * * * *